Patented May 24, 1938

2,118,789

UNITED STATES PATENT OFFICE 2,118,789

REFRACTORY

Henry C. Fisher, Worcester, Mass., assignor to Norton Company, Worcester, Mass., a corporation of Massachusetts No Drawing. Application September 27, 1935, Serial No. 42,457

2 Claims. (Cl. 106—9)

The invention relates to refractories.

One object of the invention is to provide a brick or block particularly applicable for use in boiler furnaces. Another object of the invention is to provide a refractory shape principally composed of silicon carbide which shall strongly resist oxidation. Another object of the invention is to provide a refractory shape of high heat conductivity and well adapted for practical use. Another object of the invention is to provide a shape of the type indicated which resists spalling. Another object of the invention is to provide an easily workable mixture for the manufacture of a silicon carbide refractory brick or block. Other objects of the invention are to provide muffles, saggers, plates or the like having any of the herein indicated characteristics.

Another object of the invention is to provide a refractory which resists slag action. Another object of the invention is to provide an acidic refractory material resisting slag action and oxidation, which is resistant to thermal shocks, does not easily spall, and is of adequate strength. Another object of the invention is to provide a dense refractory article having some of the characteristics indicated.

Another object of the invention is to form a thin plate which will withstand high temperatures without warping. Another object of the invention is to provide a silicon carbide refractory composition which will be self-glazing during use and which will have a relatively uniform, hard, black core throughout the body of the completed product. Another object of the invention is to provide an improved silicon carbide refractory article which will withstand elevated temperatures without material cracking. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

I provide a quantity of silicon carbide grain. While many different sizes of grain may be used, I prefer to use relatively coarse grain mixed with relatively fine grain in order that the final product shall be as dense as possible. When comminuted material is placed in a receptacle, if the comminuted material be all of the same grain size and substantially spherical in shape, and if the receptacle be relatively large with respect to an individual grain of material, then the total pore space is independent of the size of the grain. This being a general law, it is also true, more or less, with respect to other shapes. A corollary of the law is that if one uses different grain sizes, the total porosity is reduced. Accordingly, if I wish to have low porosity in the final article, I prefer to use a mixture of grain sizes.

As a preferred embodiment of my invention I may use 35% silicon carbide grain between the mesh sizes 14 and 24, 35% of silicon carbide grain between the mesh sizes 30 and 90, and 30% silicon carbide grain 100 mesh and finer. I prefer also to select grain which is fairly chunky as distinguished from slivery.

The foregoing gives 100 parts of grain. On this basis I add, in a preferred embodiment of my invention, two parts of bentonite and one-half a part of iron oxide ($Fe_2O_3$). I further add two and one-half parts of "Goulac". This makes a mixture which I use to form the refractory shapes, including all those mentioned herein and others, by pressure molding, tamping or otherwise forming a "green" shape, and thereafter firing in a kiln.

The amount of bentonite may be varied within limits, but desirably 5% or less by weight is used. Less than 2% may be used, however, but preferably the amount of bentonite is at least 1%. It is desirable to avoid the use of too much iron oxide, although up to 2% of this constituent may in certain cases be employed.

Bentonite is a widely distributed and peculiar type of clay which is considered to be the result of devitrification and chemical alteration of the glassy particles of volcanic ash or tuff. A typical bentonite may analyze approximately as follows:

| | Per cent |
|---|---|
| $SiO_2$ | 67. |
| $Al_2O_3$ | 22. |
| $Fe_2O_3$ | 4.1 |
| $MgO$ | 2.51 |
| $CaO$ | 1.25 |
| $Na_2O$ | 2.5 |
| $K_2O$ | .46 |
| $TiO_2$ | .18 |
| | 100.00 |

This is an inorganic material, an aluminum silicate and its high adsorptive, distensive and colloidal properties promotes workability of the mixture. I believe that it is the bentonite which, during the firing, sinters to some extent so that it bonds the article, and I believe further that there is something in the nature of a union between the fine silicon carbide grains and the material of or in the bentonite which produces the bond. At all events, a strong article having the characteristics hereinbefore indicated may be produced by proceeding in the manner described.

The iron oxide serves to flux the material and materially promotes the bonding of the product. It is well to avoid the use of too much iron oxide as it would react with the silicon carbide to oxidize it and also produce free iron. By the use of bentonite in connection with a suitable flux, such as iron oxide, I believe that the individual grains of silicon carbide are coated with a protecting film of oxidation resisting material. I may use a small percentage of CaO or other fluxing material to replace the $Fe_2O_3$ in whole or in part.

The reason for using Goulac is in order to obtain dry "green" strength. The mixture when pressed or tamped produces a so-called "green" article (that is to say, an article completely manufactured except for the firing) which has strength enough to resist ordinary handling in the refractory manufacturing plant. It will be understood that one of the requirements of a good mixture is that shapes shall have strength before firing, in so much as this reduces losses through careless handling. Although any starchy or sticky material can be used for such a purpose, nevertheless it is desirable to provide a material which promotes workability. Instead of Goulac, a product known under the trade name "Lignone" may be employed. This is substantially the same substance chemically, both materials being by-products of the sulphite paper manufacturing process. A typical analysis of Goulac is as follows:

|  | Per cent |
|---|---|
| Total organic and volatile | 88.37 |
| Total ash | 11.63 |
| Fe | .028 |
| $Al_2O_3$ | .054 |
| CaO | 5.988 |
| MgO | 1.8 |
| S | 4.65 |
| Moisture | 3.82 |
| (In the above the Fe and the S are probably combined, the former as an oxide.) | |
| pH | 6.23 |

Many of the advantages of the invention may be achieved using any sticky substance at all to hold the grain and bond and flux together in the green state. However, Goulac is preferred because of its relative cheapness and its satisfactory characteristics including its high ash and the fact that it is not too sticky but makes a mixture which is easily handled and worked.

Having selected materials according to the foregoing description, they may be mixed together in any suitable manner, such as by hand mixing with stirring apparatus or by a suitable mixing machine. The material is then weighed out and placed in pressure molds. It may be pressed to a desired shape and/or volume with a pressure of around three to four tons per square inch. On the other hand, for the manufacture of plates, the mixture may be tamped instead of pressed in a pressure mold. In fact, any desired method of forming a shape may be used in carrying out the invention.

With the pressure indicated a very dense product may be made on account of the use of grain of different sizes.

After the green shapes are prepared, they are placed in a kiln for firing. If thin pieces are being manufactured, it is preferable to dry them before firing on a bat or plate, turning them so that both sides will be dry in order to avoid warping. The firing temperature may be on the order of No. 16 Cone.

The brick, block, plate, bar, stick or other refractory article made according to this method and with the composition disclosed is glazed and has a hard, uniform, black core. Probably the $Fe_2O_3$ and the ash from the Goulac produces the glazing and also coats the individual grains of silicon carbide. It is the CaO in the Goulac which is the chief glazing constituent. The shapes are strong under both compression and other forces at high temperatures, that is around 1500° C. The shapes also are highly resistant to the action of hot slag. Furthermore, spalling is reduced to a minimum. It should be noted also that shapes produced according to the present process and of the composition herein set forth are high in silicon carbide content, and they have all the properties inherent in silicon carbide itself. For example, they transmit heat readily, the heat conductivity being approximately nine times that of fire clay, and they are acidic in reaction. On the other hand, however, shapes made according to the present invention resist oxidation much better than does pure silicon carbide, or shapes formed of prior silicon carbide mixtures.

The invention is not limited to the use of bentonite as any aluminum silicate which is free and hydrated as well as in a highly colloidal condition, and including clay or earthy materials, may be used. It will be understood that with the ingredients specified herein, when the mixture is being prepared, a small amount of water is added. Bentonite has the capacity of absorbing several times its own weight in water and in doing so swells up to a considerable extent and becomes a jelly-like mass. This causes the minute or colloidal particles thereof to spread over the grain surfaces in the form of a sticky gelatinous film and to these characteristics also in part may be attributed the glazed surface of the fired article and the film which probably exists on practically all of the grains of silicon carbide, both of which protect the silicon carbide from attack by oxidation. The use of bentonite, or a material having its characteristics, permits the manufacture of a satisfactory refractory article which is nearly all silicon carbide, or stating this in another way which has high silicon carbide content. Thus a highly refractory product results.

It will thus be seen that there has been provided by this invention a method, a composition, and an article of manufacture, in which the various objects hereinabove set forth together with many thoroughly practical advantages are successfully achieved. As various possible embodiments might be made of the above invention and as the art herein described might be varied in various parts, all without departing from the scope of the invention, it is to be understood that all matter hereinbefore set forth is to be interpreted as illustrative and not in a limiting sense.

While as the specific embodiment of the bonding ingredient I have referred to bentonite, which has the capacity of absorbing several times its own weight in water thereby swelling, it should be understood that other equivalent substances may be used, known equivalents of bentonite, which are also probably the result of devitrification and chemical alteration of the glassy particles of volcanic ash or tuff, being ehrenbergite, damonterolite and montmorillonite. In the appended claims where reference is made to bentonite this is deemed to include such equivalents and any clay-like substances of the same general chemical formulae having high adsorptive, distensive and colloidal properties.

I claim:—

1. A refractory mixture comprising a molded body composed of the following materials in substantially the proportions stated by weight, 95% of silicon carbide grains, 2% of bentonite, 2½% of Goulac, and 0.5% of ferric oxide.

2. Method of manufacturing a silicon carbide refractory article with a glaze which consists in providing a quantity of silicon carbide grain, adding a small proportion (5 per cent or below) of bentonite, adding a small proportion (2 per cent or less) of iron oxide, molding and firing, the ingredients mentioned reacting to form a glaze on the surface of the article.

HENRY C. FISHER.